United States Patent [19]

Yoshihara et al.

[11] Patent Number: 4,496,830
[45] Date of Patent: Jan. 29, 1985

[54] TICKET CHECKING APPARATUS

[75] Inventors: Setsuo Yoshihara, Ebina; Yorihumi Otsubo; Takashi Kobayashi, both of Yokohama, all of Japan

[73] Assignee: Tokyo Shibaura Denki Kabushiki Kaisha, Japan

[21] Appl. No.: 386,084

[22] Filed: Jun. 7, 1982

[30] Foreign Application Priority Data

Jun. 10, 1981 [JP] Japan .................................. 56-88244

[51] Int. Cl.³ .............................................. G06K 7/10
[52] U.S. Cl. .................................... 235/458; 235/454; 235/456
[58] Field of Search .................. 235/454, 458, 456

[56] References Cited

U.S. PATENT DOCUMENTS

| 3,341,691 | 9/1967 | Modersohn | 235/458 |
| 3,870,865 | 3/1975 | Schneiderhan | 235/456 |
| 3,971,473 | 7/1976 | Ernst | 235/458 |
| 4,103,150 | 7/1978 | Von Ballmoos | 235/454 |
| 4,126,780 | 11/1978 | Rosenthal | 235/458 |
| 4,142,673 | 3/1979 | Dar | 235/458 |
| 4,295,040 | 10/1981 | Berthier | 235/458 |

Primary Examiner—Harold I. Pitts
Attorney, Agent, or Firm—Cushman, Darby & Cushman

[57] ABSTRACT

An optical scanner produces an image signal corresponding to a shape of a ticket scanned by the optical scanner. Signal components corresponding to a given range of the ticket is extracted from an image signal of the optical scanner. A level of the signal components is compared with a reference level. Presence or not of a punch hole in the ticket is judged on the basis of the result of the comparison of the comparator.

7 Claims, 13 Drawing Figures

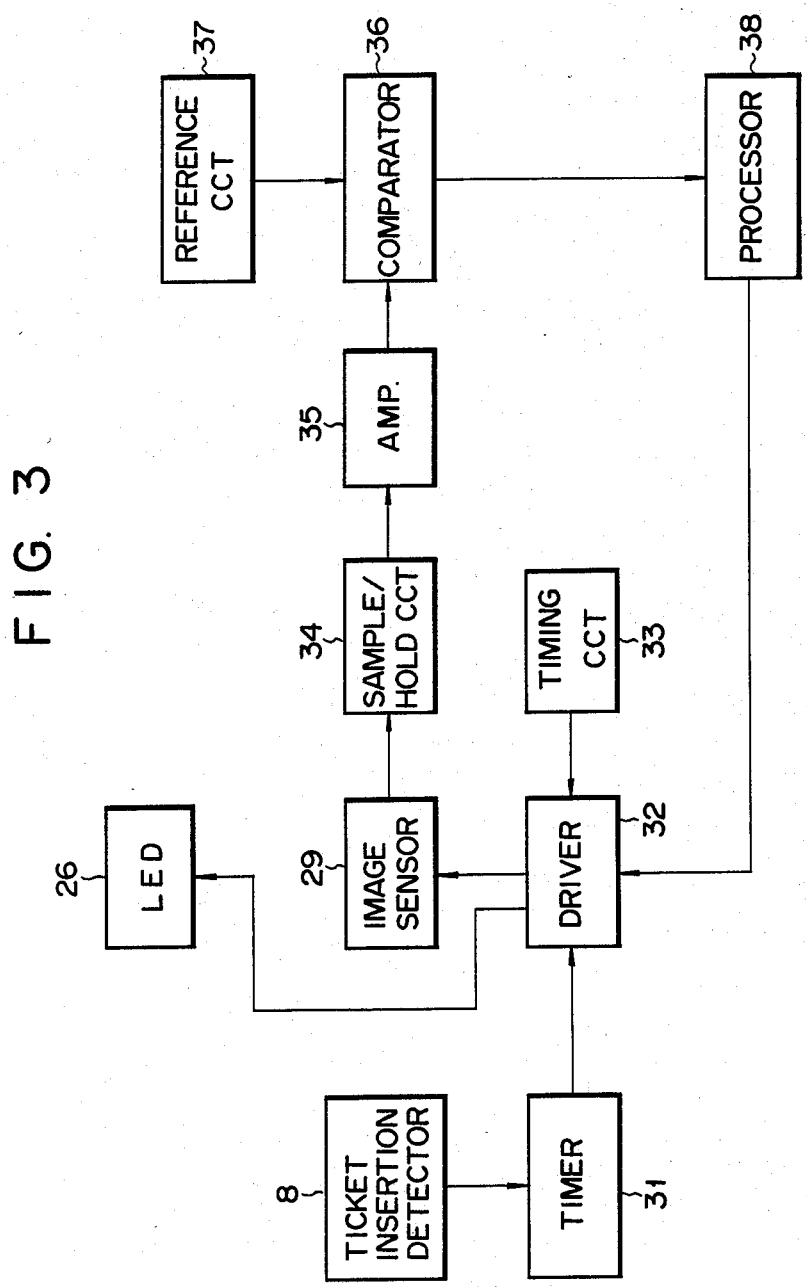

F I G. 4A 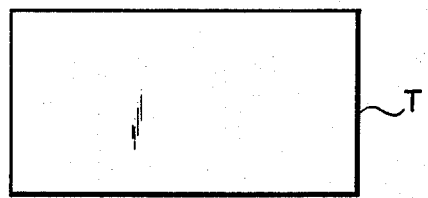
F I G. 4B 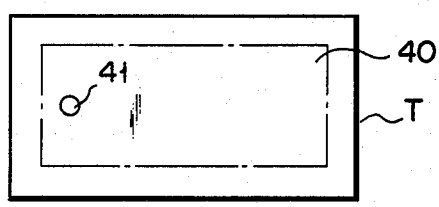
F I G. 4C 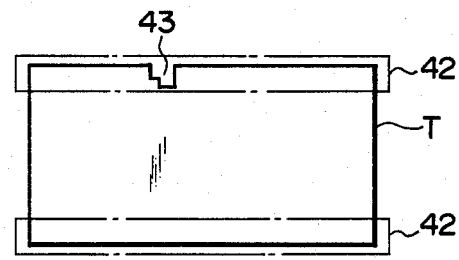
F I G. 4D 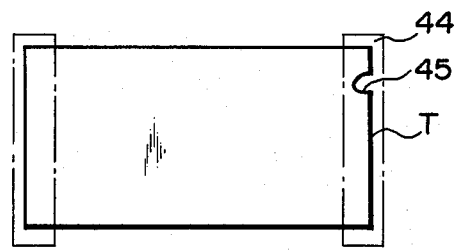

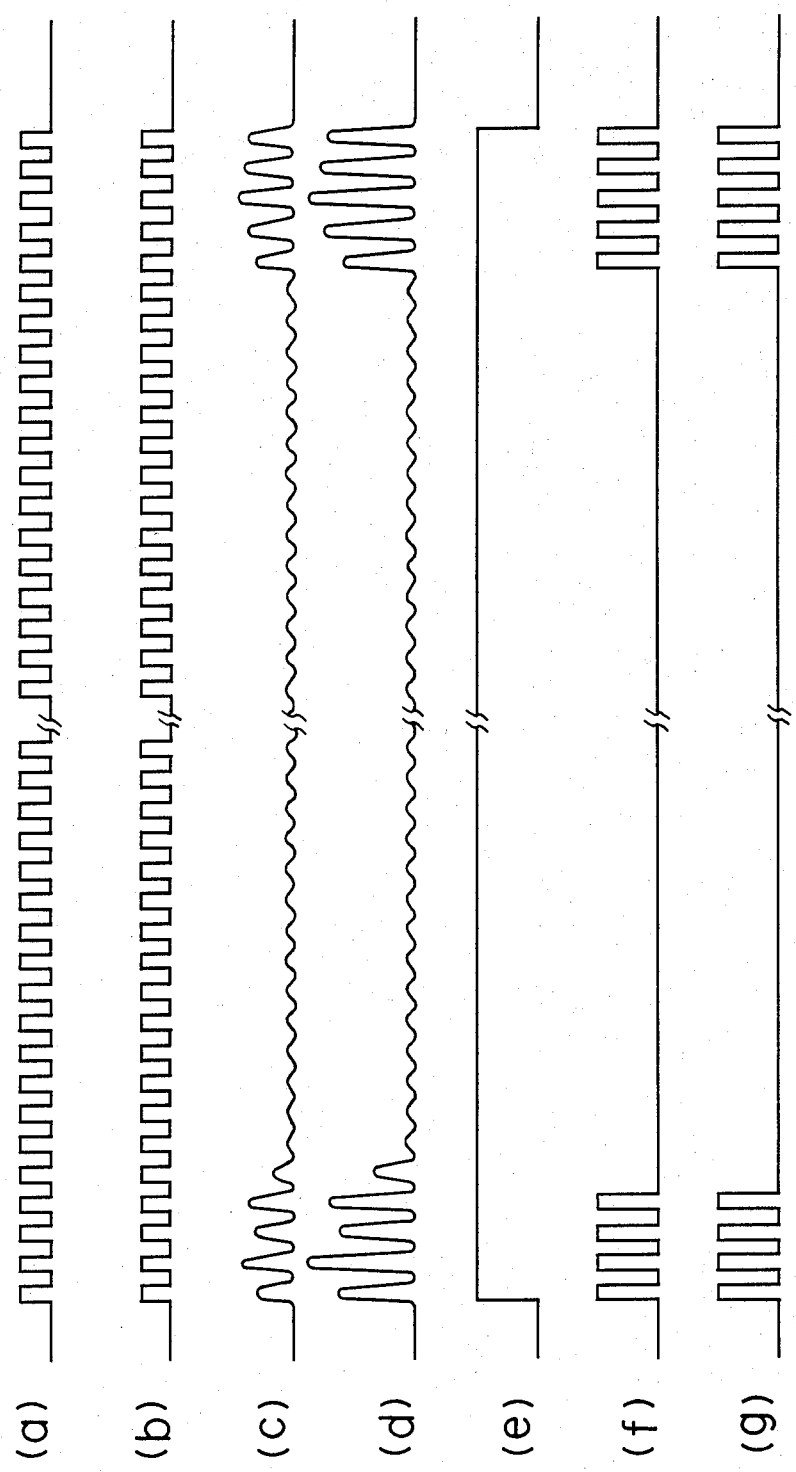

TICKET CHECKING APPARATUS

BACKGROUND OF THE INVENTION

The present invention relates to a ticket checking apparatus and, more particularly, to a ticket checking apparatus for automatically checking tickets in a transportation system.

In the transportation system, particularly in rail road system, automatic ticket gates are widely used. There is now a plan for establishing an automatic ticket checking system operable for any types of tickets in an entire rail road system. At present, however, most of the railway companies have not yet established a full automatic ticket checking system in the entire railroad network, from the cost and cost/performance standpoint. The ticket checking system currently employed by the railroad company is a combination of manual and automatic ticket checking systems. Accordingly, manually punched tickets and automatically punched tickets must concurrently be handled. In the former ticket, a punched location on the ticket is not fixed or random, while in the later case, it is fixed. As a result, the automatic ticket checking apparatus can not check all types of the tickets. Accordingly, there is a danger that the tickets once used may be used again.

SUMMARY OF THE INVENTION

Accordingly, an object of the present invention is to provide an automatic ticket checking apparatus which can automatically check tickets once checked manually or automatically.

According to the present invention, there is provided an automatic checking apparatus in which a ticket under check is optically scanned at a density allowing a check mark on the ticket under check to be detected, the presence or absence of a check mark is judged on the basis of the output signal from the scanner, and the validity or invalidity of a ticket under check is judged on the basis of the output signal from the judging circuit.

BRIEF DESCRIPTION OF THE DRAWINGS

FIG. 3 shows a block diagram of the automatic ticket checking apparatus shown in FIG. 1;

FIGS. 4A to 4D show plan views of tickets;

FIG. 8, consisting of (a)–(g), shows a set of waveforms useful in explaining the operation of the circuit shown in FIG. 6;

DETAILED DESCRIPTION OF THE PREFERRED EMBODIMENTS

Figure 1:
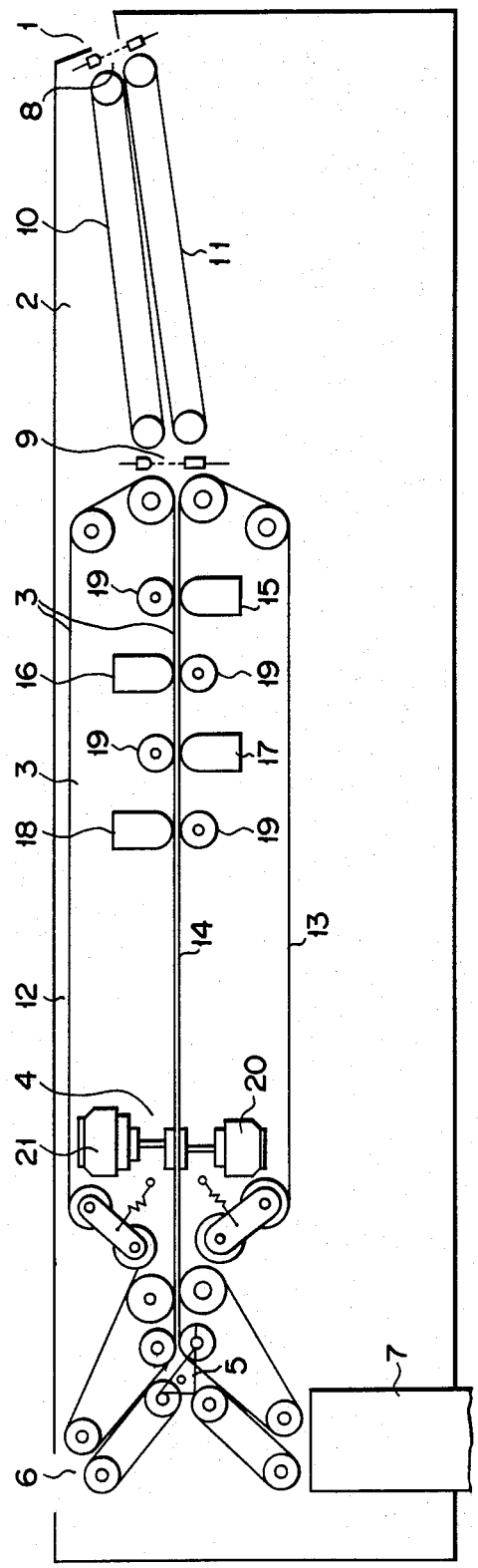
FIG. 1 shows a schematic diagram of an automatic ticket checking apparatus according to an embodiment of the present invention.

In FIG. 1, various types of tickets with different sizes such as regular tickets, express tickets, seasonal tickets, etc., are put into a ticket or card inlet 1. The tickets then are aligned in an alignment section 2. A ticket insertion detector 8 and an optical scanner 9 to be described later are provided at an inlet and an outlet of the alignment section 2, respectively. The inserted ticket is transported to the scanner 9 by conveyers 10 and 11, through the detector 8. The ticket is then fed into a ticket way formed between conveyer belts 12 and 13. Along the ticket way 14, read magnetic heads 15 and 16 and wire magnetic heads 17 and 18 are disposed in succession. Press rollers 19 are provided in opposition to the magnetic heads 15 and 18 to press the traveling ticket against the corresponding magnetic heads 15 to 18 to ensure reliable read and write of data to and from the magnetic layer of the ticket. An automatic punch device 4 is provided on the ticket way 14. The automatic punch device 4 is comprised of a stopper 20 and a puncher 21 and puches the ticket to form a punch hole at a given location of the ticket segregated from the area having information formed thereon. The ticket passing through the automatic punch device 4 is led to a selector 5 which guides the ticket to a return slot 6 or a collector 7.

Figure 2:
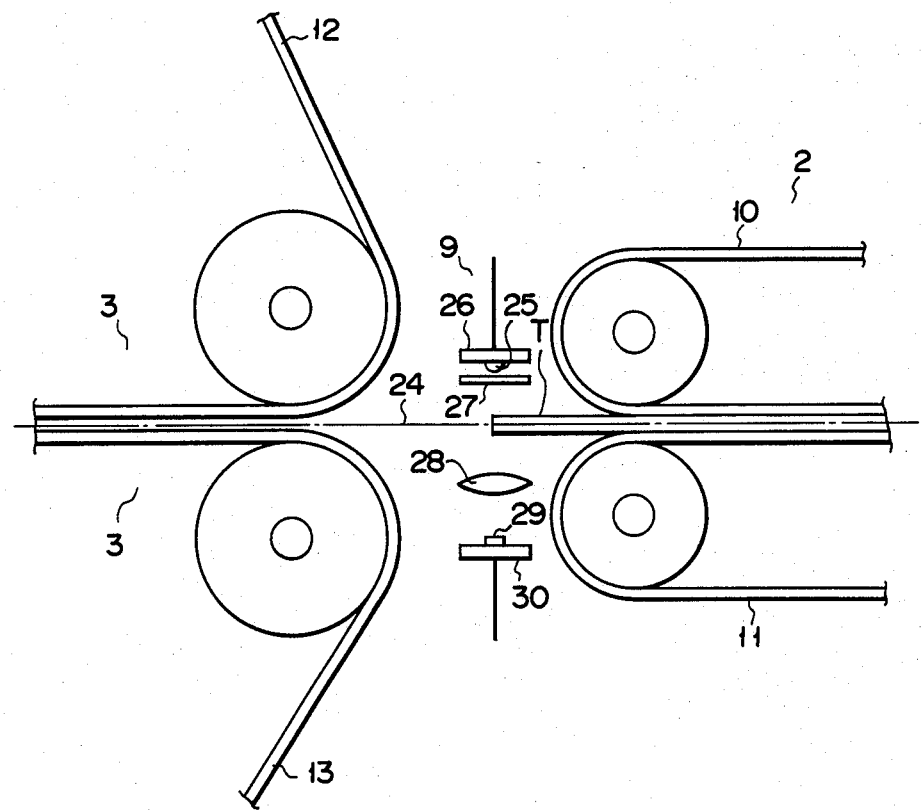
FIG. 2 shows a side view of an optical checking section of the automatic ticket checking apparatus shown in FIG. 1.

FIG. 2 shows a structure of the optical scanner 9. As shown, a light emitting unit 26 having a plurality of light emitting elements 25 arranged along and with respect to the width of the traveling ticket T and a photoelectric sensing unit 30 including a photoelectric sensor, for example, a CCD image sensor 29 are oppositely disposed along the ticket way 24. The light emitting unit 26 is further provided with an optical diffuser 27 for making uniform the light rays from the light emitting elements 25. The photoelectric sensing unit 30 further includes a lens 28 for collecting the light rays from the light emitting unit 26 into a photo electric sensor 29.

Turning to FIG. 3, there is shown a block diagram of the automatic ticket checking apparatus shown in FIG. 1. In the circuit, the output terminal of the ticket insertion detector 8 is connected to the input terminal of a timer 31. The output terminal of the timer 31 is connected to the set terminal of a drive circuit 32. The output terminal of the drive circuit 32 is connected to the light emitting unit 26 and the CCD image sensor 29. The driver unit 32 is connected to a timing circuit 33 for timing the light emitting unit 26 and the CCD image sensor 29. The output terminal of the image sensor 29 is connected to an input terminal of a sample/hold circuit 34. The output terminal of a sample/hold circuit 34 is connected to the first input terminal of a comparator 36 through an amplifier 35. The second input terminal of the comparator 36 is connected to a reference circuit 37. The comparator 36 is connected to a processor circuit 38, for example, a CPU.

The operation of the above-mentioned embodiment will be described. When the ticket T is put into the ticket inlet 1, the detector 8 detects presence of the ticket T. When a ticket detection signal from the detector 8 is supplied to the timer 31, the timer 31 responds to the ticket detection signal to be set to a time taken for the ticket to travel from the detector 8 to the optical sensor 9. As the ticket T reaches the optical scanner 9, the timer applies a set signal to a driver circuit 32 and drives the circuit 32. In synchronism with the timing signal from the timing circuit 33, the driver circuit 32 drives the light emitting unit 26 and the image sensor 29. The light emitting elements 25 of the light emitting unit 26 are successively lit from one end to the other end, so that the light beam emitted from the light emitting unit 26 scans the ticket T in the width direction of the ticket. Through the scanning, the ticket is scanned at intervals of 2 mm, to produce an image signal corresponding to a ticket shape or ticket pattern from the image sensor 29. The image signal from the image sensor 29 is sampled and held by the sample/hold circuit 34, amplified by the amplifier 35, and then is applied to the comparator 36. The image signal is compared with a reference signal from the reference circuit 37. The compared signal is supplied to the CPU 38. The CPU 38 judges as to whether the ticket inserted is valid or invalid. In the judgement, there is judged whether a "light" signal is obtained or not from the optical scanner 9 within a given scanning range when the ticket is scanned by the optical scanner 9. For example, when a non punch hole ticket is inserted into the automatic ticket check apparatus, such ticket is judged to be invalid since the "light" signal is not obtained. If the ticket punched by the automatic puncher, as shown in FIG. 4B, has a punch hole 41 in the scanning range 40, this ticket is judged to be valid since the optical scanner 9 generates a "light" signal. FIGS. 4C and 4D show tickets manually punched by a ticket clerk, respectively. The ticket of FIG. 4C has a punched portion 43 on the top edge 42 as viewed in the drawing. In the case of FIG. 4D, a punched portion 45 is formed on the right endge 44 of the ticket. The CPU 38 detects the presence of the punched portion 43 or 45 on the basis of the output signal from the comparator 36 and judges it is valid. After the judgement, the CPU 38 resets the drive circuit 32.

When the ticket passes the optical scanner 9, data recorded on the magnetic recording layer formed on the reverse side of the ticket by the read magnetic head 15 or 16 is read out. The read out data is transferred to a processor (not shown), for example, which then judges whether or not the ticket is valid or invalid on the basis of the transferred data in a known manner. Some magnetic ticket 17 or 18 records a ticket code on the magnetic recording layer of the ticket. The ticket is punched by the automatic punch device 4. The ticket passing through the punch device 4 is led to the return slot 6 or the collector 7 by the selector 5. The valid ticket or entrance ticket is transferred to the return slot 6 and the invalid ticket or exit ticket to the collector 7. The guidance of the tickets to the return slot 6 or the collector 7 is performed by the selector 5 on the basis of the judgement by the CPU 38 or the processor.

Figure 5:
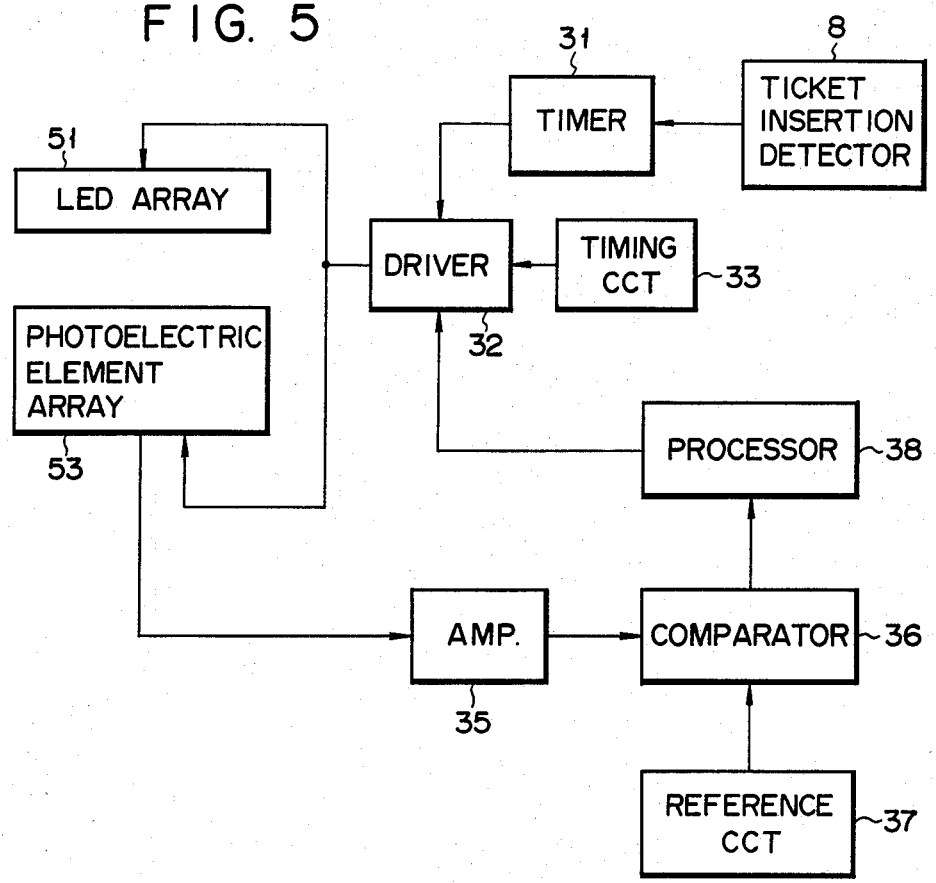
FIG. 5 shows a block circuit diagram of an automatic ticket checking apparatus according to another embodiment of the present invention.
Figure 6:
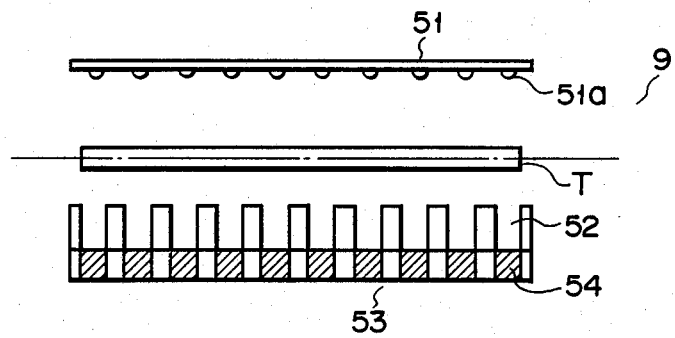
FIG. 6 is a sectional view of a scanner used in the automatic ticket checking apparatus shown in FIG. 5.
Figure 7:
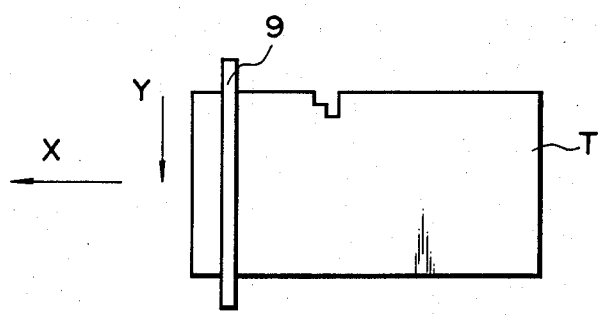
FIG. 7 illustrates a scanning state of a ticket under check by the scanner shown in FIG. 6.

Another embodiment of tha automatic ticket checking apparatus according to the present invention will be described referring to FIG. 5. Like reference numerals are used for designating like portions in the abovementioned embodiment. In the scanner 9, a photoelectric device 53 is provided with a plurality of slits 52 facing the light emitting elements 51a of the light emitting unit 51 disposed in the width direction of the ticket T. Photoelectric elements 53 are provided in the slits 52, respectively. The light emitting unit 51 and the photoelectric device 53 are connected to the drive circuit 32. The photoelectric device 53 is connected to the first input terminal of the comparator 36 through the amplifier 35.

In the present embodiment, when the ticket is detected by the detector 8 and the drive circuit 32 is set by the output signal from the timer 31. Then, the light emitting unit 51 and the photoelectric device 53 are driven by the drive circuit 32 in synchronism with the timing signal from the timing circuit 33, like a signal a in FIG. 8. Specifically, twenty light emitting elements 51a disposed at intervals of 2 mm are successively lit from one end to the other end at the timing of the signal b, while at the same time the photoelectric elements 54 transfers photoelectric signals to the amplifier 35. In this way, the light emitting unit 51 and the photoelectric device 53 are driven, so that the optical scanner 9 scans the ticket in a Y direction at a scanning rate of 0.5 msec. The ticket is transported at a speed of 2 m/sec, for example. As a result, the ticket is scanned from the leading end to the trailing end at intervals of 1 mm. In such a scanning, the high level component of the output signal c from the photoelectric device 53 represents a "light" signal component or a signal component not interrupted by the ticket. A "drak" signal, or a signal derived from the photoelectric elements shut off by the ticket, contains signal components in level comparable with the noise level. The photoelectric signal c of the photoelectric device 53 is amplified to a signal d by the amplifier 53. Then, it is supplied to the comparator 36 where it is compared with the reference signal e from the reference circuit 37 to transform the signal c into a signal f. The signal f is then supplied to the processor unit 38. In the processor unit 38, the signal f is compared with the drive signal a from the drive circuit 32 to determine levels of the photoelectric signals of the photoelectric elements 54. The processor unit 38 analyzes the signal g to judge as to whether or not the ticket has a punched portion.

Figure 9:
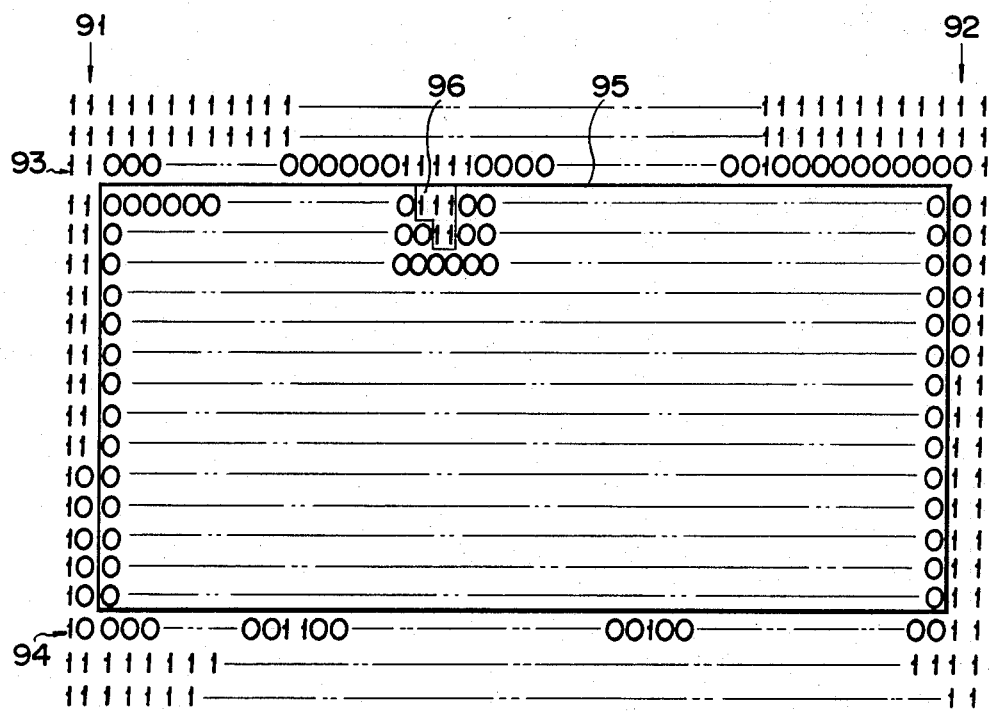
FIG. 9 shows a binary pattern of a ticket under check.

The processor unit 38 converts the signal g into a bit pattern as shown in FIG. 9. The presence or absence of the punched portion is judged on the basis of the bit pattern. In the bit pattern, "1" designates the light component and "0" shows the dark component. In the bit pattern, "0" representing the dark starts from 91 on the second row in the pattern and terminates at 92 on the 59th row. The length between the 91 on the 2nd row and 92 on the 59th row corresponds to the length of the ticket. The width of the ticket ranges from 93 on the 3rd row to 94 on the 18th row. In the bit pattern, 91 on the 2nd row, 92 on the 59th row, 93 on the 3rd row, and 94 on the 18th row are excluded from the checking range. "1" in the area 95 as enclosed by a solid line is checked. The area 95 contains a "1" pattern portion 96 corresponding to the punched away portion. The "1" pattern portion is judged as the presence of the punched away portion. On the basis of the judgement of the processor unit 38, the ticket is guided to the return slot 6 or the collector 7.

Figure 10:
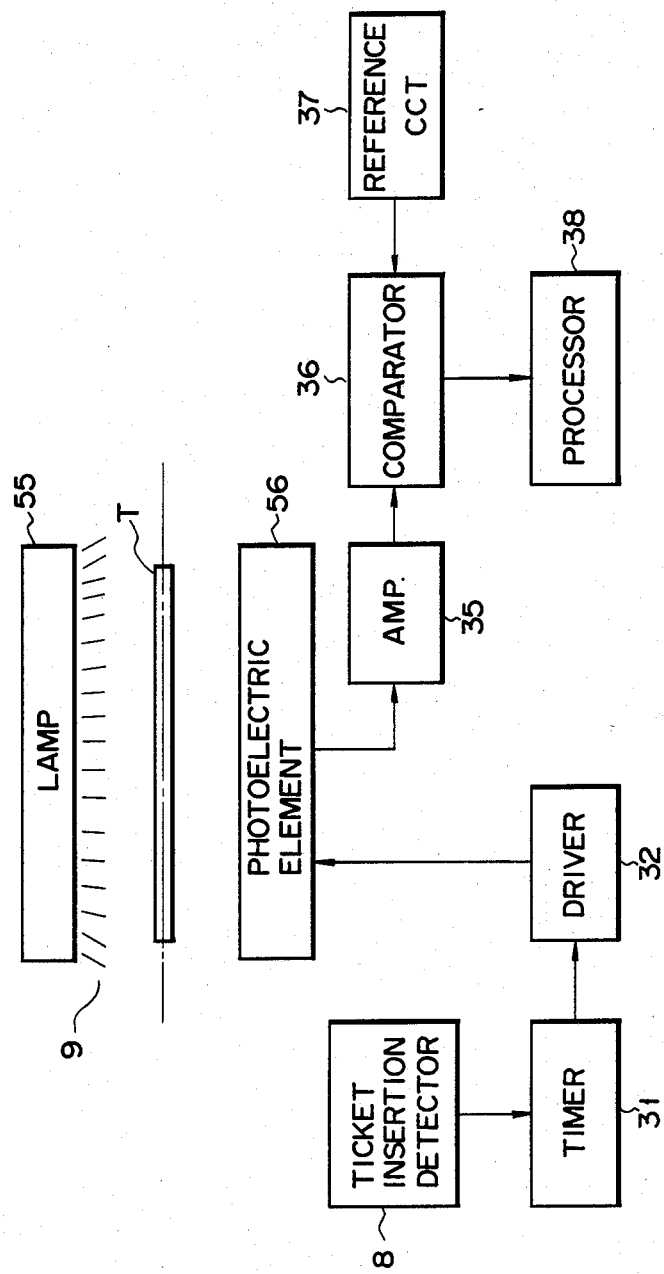
FIG. 10 is a block diagram of an automatic ticket checking apparatus of another embodiment according to the present invention.

In the above two embodiments, the light emitting unit is made up of light emitting elements. A line type illuminating member 55 like a fluorescent lamp may be used in place of the light emitting elements, as shown in FIG. 10. Further, the photoelectric device may be made up of a long single photoelectric device with a length corresponding to the width of the ticket. In this case, a high precicision comparator must be used for the comparator for judging a level of the photoelectric signal.

As described above, the ticket is scanned by an optical scanner and the presence or not of the punch hole is judged on the basis of the image signal derived from the optical scanner. Further, the valid or invalid of the ticket is judged on the basis of this judgement. Therefore, the automatic ticket checking apparatus can reliably check the automatically or manually punched tickets.

It is evident that the present invention is applicable for the ticket checking service in theaters, etc.

What we claim is:

1. A ticket checking apparatus comprising: a ticket signal generator for producing a ticket signal corresponding to a shape of a ticket;
    means for extracting signal components corresponding to at least one manually punched portion on the peripheral edge of said ticket or at least one automatically punched hole in a predetermined position thereof from a ticket signal derived from said ticket signal generator and for judging as to whether said ticket is valid or invalid on the basis of said signal components.

2. A ticket checking apparatus according to claim 1, wherein said ticket signal generator is an optical scanner for optically scanning said ticket to produce an image signal corresponding to the shape of said ticket.

3. A ticket checking apparatus according to claim 2, wherein said optical scanner includes a light emitting unit for optically scanning said ticket made up of a plurality of light emitting elements disposed in a width direction of said ticket and lit successively, and an optical sensor for producing an image signal corresponding to optical image obtained by an optical scanning by said light emitting unit disposed opposite to said light emitting unit.

4. A ticket checking apparatus according to claim 3, wherein said optical sensor is a CCD optical image sensor.

5. A ticket checking appartaus according to claim 3, wherein said optical sensor includes a plurality of photoelectric elements disposed oppositely to said light emitting elements, respectively.

6. A ticket checking apparatus according to any one of claims 1 to 5, wherein said judging means includes means for comparing level of said signal components with a reference level, and means for judging the presence or absence of a punch mark on said ticket on the basis of the comparing result.

7. A ticket checking apparatus according to any one of claims 1 to 5, wherein said judging means includes means for level-shaping said ticket signal into a reference level and means for converting said level shaped ticket signal into a bit pattern and for judging the presence or not of the ticket on the basis of said bit pattern.

* * * * *